Oct. 18, 1932.                M. J. ADAMS                  1,882,685
                              VEHICLE WHEEL
                           Filed Oct. 19, 1931
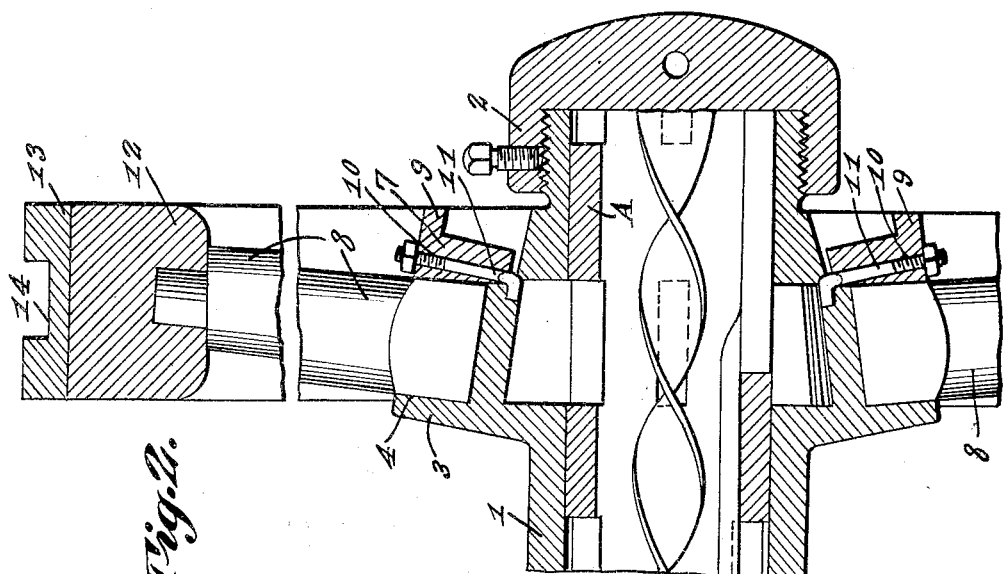
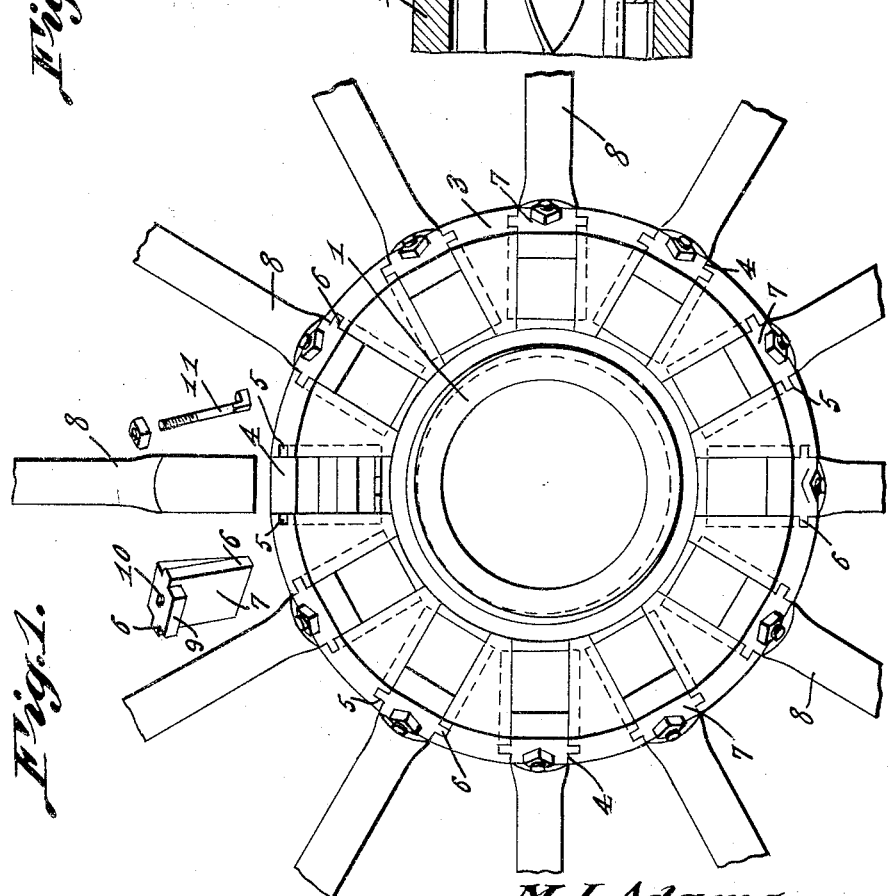
M. J. Adams, INVENTOR
BY Victor J. Evans and Co.
ATTORNEY Patented Oct. 18, 1932

1,882,685

UNITED STATES PATENT OFFICE

MATHIAS J. ADAMS, OF TURKEY RIVER, IOWA

VEHICLE WHEEL

Application filed October 19, 1931. Serial No. 569,783.

This invention relates to vehicle wheels, and its general object is to provide a wheel that includes detachable spokes, so that in the event one or more spokes should become broken or damaged they can be easily and expeditiously replaced.

A further object of the invention is to provide a vehicle wheel that includes detachable spokes that are securely held against casual removal or displacement.

A still further object of the invention is to provide a vehicle wheel that not only includes detachable spokes, but a rim that is grooved longitudinally to prevent lateral skidding and to accommodate the heads of securing means for the rim.

Another object of the invention is to provide a vehicle wheel of the character set forth, that is simple in construction, inexpensive to manufacture and extremely efficient in operation and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:

Figure 1 is a fragmentary front elevation of a vehicle wheel constructed in accordance with the present invention, with the spokes broken away and the felly and rim removed.

Figure 2 is a fragmentary vertical sectional view taken through my wheel.

Referring to the drawing in detail, the letter A indicates a spindle which rotatably receives the hub 1 of my wheel, the hub being provided with a threaded collar for the purpose of receiving a cap 2 that is fixedly secured to the collar through the instrumentality of a set screw as shown and extending from the cap 2 is a spirally arranged rod disposed centrally within the spindle, the rod forming part of the lubricating system disclosed by my co-pending application entitled Automatic force oiling vehicle gear, Serial No. 426,413, and the rod assures proper lubrication of the wheel disclosed by the present application as will be apparent, due to the fact that the spindle is provided with slots as shown for the passage of the lubricant to the hub.

Surrounding the hub and being formed therewith or otherwise secured thereto is a ring member 3 that is shown as being inclined toward the outer portion of the wheel and includes a plurality of equi-distantly spacedly arranged sockets radiating from adjacent the inner end of the hub as best shown in Figure 1. The sockets have their front portions open and disposed vertically and longitudinally of the sockets and extending into the side walls thereof are recesses 5 for the purpose of receiving the side edges 6 of wedge members 7 which are of a size to snugly fit within the front portions of the sockets, the latter being indicated by the reference numeral 4.

The spokes which are indicated by the reference numeral 8 have their inner portions squared for the purpose of fitting the remaining portions of the sockets 4 as clearly shown in Figure 2, and the inner faces of the wedge members 7 are inclined for engaging the outer faces of the spokes in order to set up a wedging action.

The wedge members are provided with lugs 9 whereby they can be easily inserted and removed from the sockets 4 and extending centrally through the wedge members are bores 10 to receive bolts 11 that are provided with right angle bent ends for the purpose of being received in openings formed in the ring members as clearly shown in Figure 2. The bolts are held in operative position through the medium of nuts, and in disposing the wedge members in engagement with the spokes and securing the same accordingly, the bolts are first placed in operative position, thence the wedges are received by the bolts and driven inwardly to the extent desired against the spokes, and then the nuts are applied, with the result casual removal or displacement of the spokes will be prevented, yet at the same time the spokes can be readily removed when desired.

The outer end of the spokes are reduced in the usual manner and received in a felly 12, the latter having secured thereto a tire or rim of a particular construction, as it will be noted that the tire which is indicated by the reference numeral 13 is circumferentially grooved as at 14, the groove being arranged midway the side edges of the tire, and by this construction, it will be obvious that the groove will not only have a tendency to prevent slippage and lateral skidding but in the event the tire is secured on the felly through the instrumentality of bolt and nut connections, the heads of the bolts can be countersunk within the groove.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a vehicle wheel, a hub, means included in said hub and being provided with sockets having recesses in the sides thereof, spokes having square inner ends received in the sockets, wedges having bores and received in the sockets with their side edges disposed in the recesses, said wedges being engageable with the square inner ends for securing the spokes in the sockets, bolts having right angle bent ends and passing through the bores, said right angle bent ends adapted to be detachably anchored in said means, nuts for the bolts and cooperating therewith for securing the wedge members in operative position, and means formed with the wedges to facilitate the insertion and removal thereof with respect to the sockets.

In testimony whereof I affix my signature.

MATHIAS J. ADAMS.